June 11, 1935.  T. C. ASKLAND  2,004,090
CORN BINDER
Filed Dec. 13, 1934   3 Sheets-Sheet 3
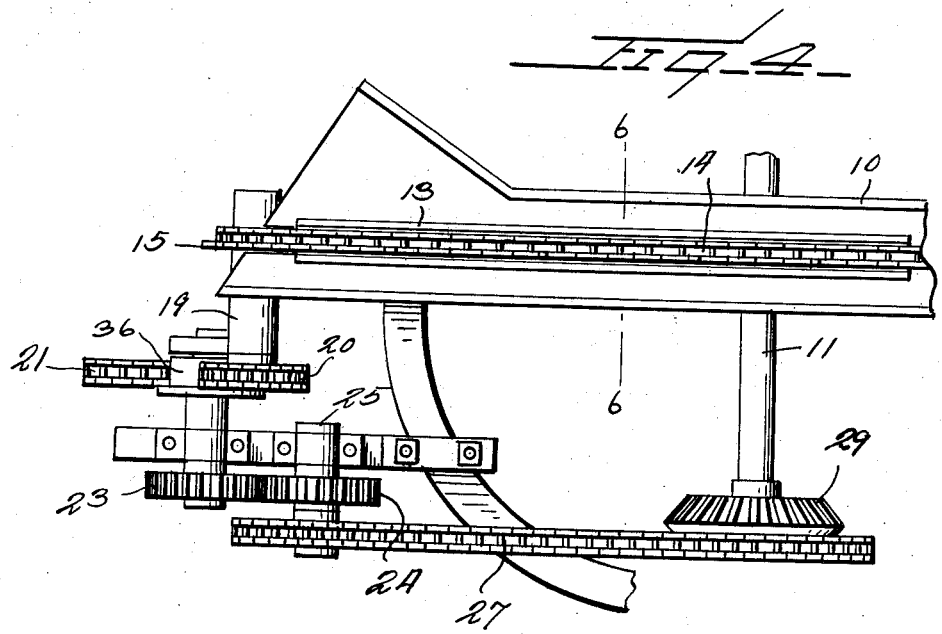
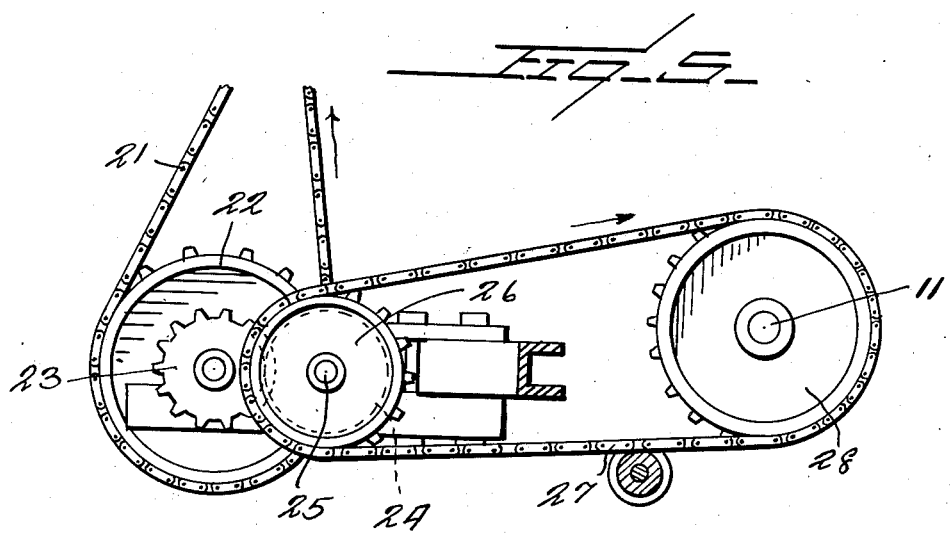
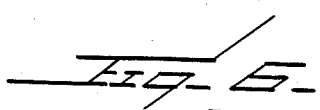
Inventor
T. C. Askland
By Watson E. Coleman
Attorney Patented June 11, 1935

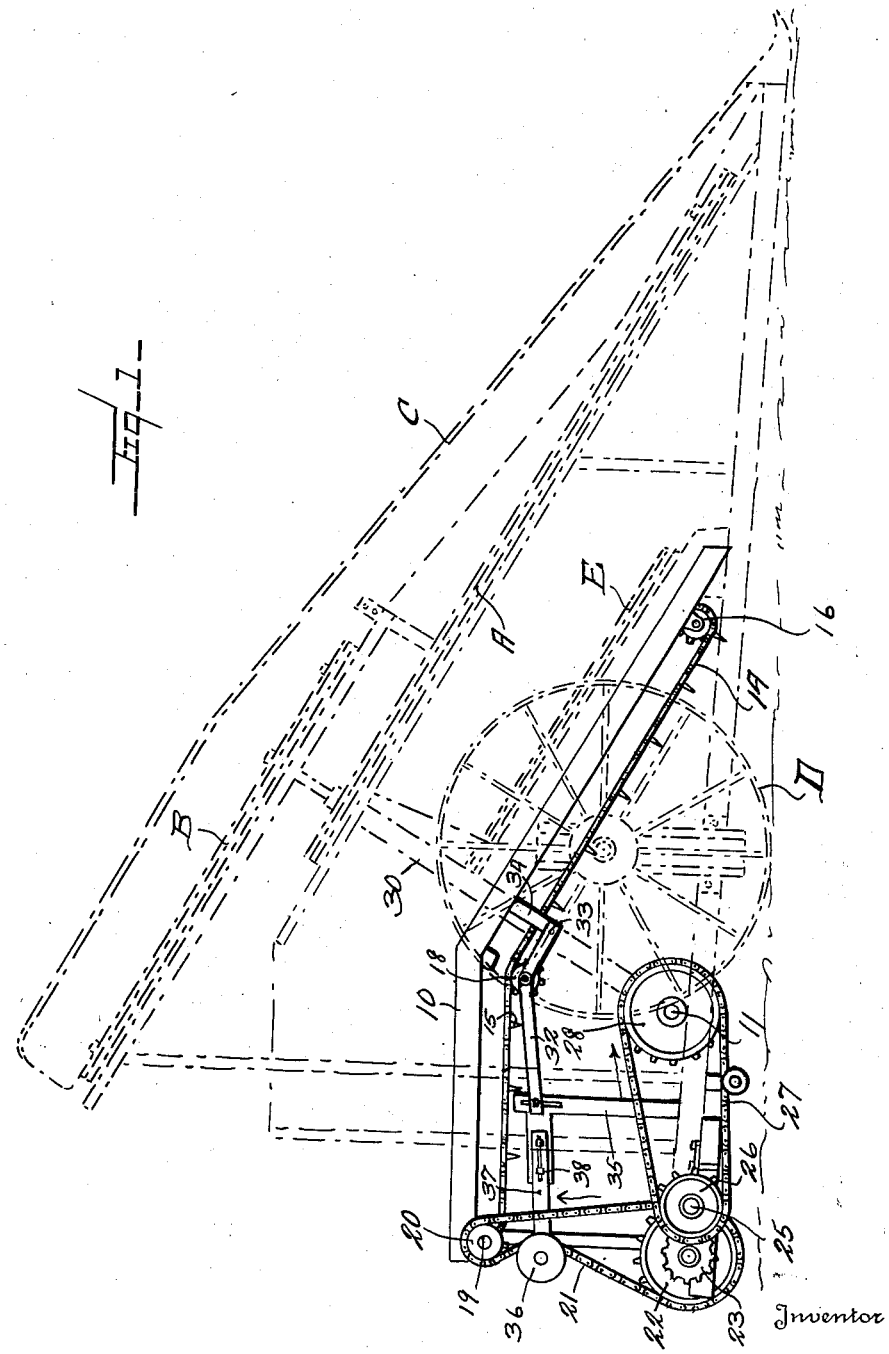

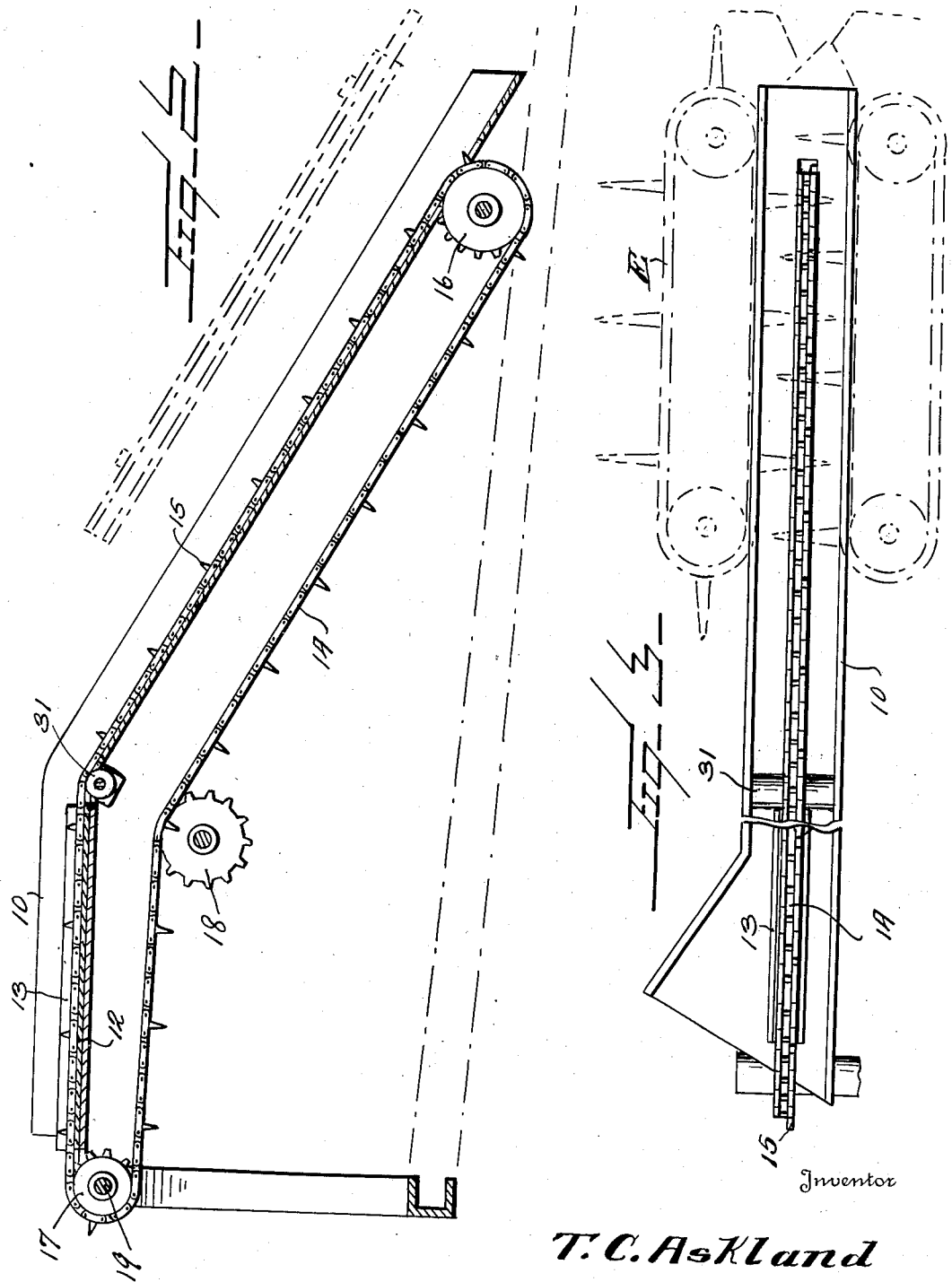

2,004,090

UNITED STATES PATENT OFFICE 2,004,090

CORN BINDER

Thomas C. Askland, Reeder, N. Dak.

Application December 13, 1934, Serial No. 757,349

4 Claims. (Cl. 56—466)

This invention relates to corn binders and like mechanisms and particularly to means for supporting the butts of the corn as the corn is carried upward by chains.

The general object of this invention is to provide an additional chain carried by or on the butt chute which will act to prevent the butts of the corn stalks from dragging on the chute and particularly which will act to keep the butt chute clear of ears of corn and trash which may gather in the chute.

Chutes have been provided upon which the butts of the corn stalks travel but one of the objectionable features of these chutes resides in the fact that they readily become clogged and the driver of the machine has to stop ever so often to clear out the chute so as to permit the rearward movement of the corn stalks.

My invention is illustrated in the accompanying drawings, wherein:—

Figure 1 is an enlarged view in elevation of my improvement, the improvement being shown in full lines, the dotted lines showing a schematic elevation of the ordinary corn binder;

Figure 2 is an enlarged sectional view taken longitudinally through the butt chute showing my clearing chain applied thereto;

Figure 3 is a top plan view of the structure shown in Figure 2;

Figure 4 is a fragmentary top plan view of the entrance end of the corn chute showing the driving mechanism for the clearing chain;

Figure 5 is a side elevation of the driving mechanism, a portion of the frame being in section;

Figure 6 is a section on line 6—6 of Figure 4.

In the drawings I have illustrated in dotted lines those portions of a corn binder which are old and well known, these include the upwardly and rearwardly extending chains A, there being two chains opposed to each other as usual, the upwardly and rearwardly extending chains B, the gatherer boards C, and the usual wheels D. Just above the butt chute 10 are the usual chains E shown in dotted lines, all of these chains are operated from a driving shaft 11.

The standing corn passes between the chains A and the gatherer boards C and as the standing corn is nipped by the chains A the corn is cut closely adjacent to the ground by means which are not illustrated but which are common in all binders. This occurs of course in advance of the chute 10. The stalks of corn so cut are lifted by the chains A and E and are carried up the butt chute 10, bound by binding mechanism which is not illustrated and then discharged at the rear end of the machine.

As before stated, the main object of my invention is to eliminate the collection of trash such as bits of corn stalks, leaves, and ears of corn on the chute 10 and to this end I provide the chute 10, as shown in Figure 6, at its upper horizontal portion with a medially disposed channel iron 12 having upwardly extending side walls 13. Operating between the side walls is the upper flight of an endless chain 14 having outwardly extending teeth thereon. The upper flight of this chain extends over nearly the entire length of the chute 10 and the chain is trained over the two end sprocket wheels 16 and 17 and the lower stretch of the chain passes over the guide sprocket wheel 18. The chute 10 extends upward to a point above the sprocket wheel 18 and then extends horizontally, and the upper flight of the chain 14 follows the same path. The sprocket wheel 17 is carried by a shaft 19 and this shaft carries upon it the sprocket wheel 20 over which a sprocket chain 21 passes. This chain 21 also passes over a relatively large sprocket wheel 22 carrying upon it the gear wheel 23 which meshes with pinion 24 mounted upon a stub shaft 25 which carries the sprocket wheel 26 over which a driving sprocket chain 27 passes, this shaft being driven by means of a sprocket wheel 28 carried by the shaft 11. This shaft, as shown in Figure 4, carries upon it the bevel gear wheel 29 which as usual drives the shaft 30 shown in dotted lines in Figure 1 which in turn drives the chains A and E.

Of course, the chute 10 is slotted at its forward and rear ends to permit the passage of the chain 14 upward through the lower end of the chute.

While I have illustrated the sprocket chain 14, which constitutes the clearing chain, as being driven from the main driving shaft of the mechanism illustrated, it is obvious that other driving means might be used for this purpose and I do not wish to be limited to the particular driving means shown.

At the junction of the upwardly inclined and horizontal portions of the chute there is provided a steel roller 31 over which the chain passes at the angle so as to take the wear of the chain off of the bottom of the chute at this point and raise the chain to a level with the bottom of the channel iron 12. The lower flight of the chain passes over the chain tightening sprocket wheel 18 which, as shown, is mounted upon a lever 32, pivoted at 33 to a frame member 34. The free end of this lever carries a bolt operating within a slot of a vertical frame member 35. The chain 21 is tightened by means of a chain tightening roller or sprocket wheel 36 carried by a member 37, adjustably bolted at 38 to an arm of the member 35.

In the operation of the corn binder with my improvement applied thereto the stalks are carried upward by the opposed chains A and E and the butts of the stalks ride upward on the chute but are assisted in their upward movement by the lugs projecting upward from the chain 14. At the same time these lugs act to clear out any trash which may gather in the chute or any ears of corn which may fall into the chute and thus continuously keep the chute clear and carry the leaves, corn ears, or trash to the rear of the machine discharging it from the end of the chute, thus this machine may be driven continuously forward without the necessity of the operator stopping every few minutes to clear the chute as is necessary with other corn binders known to me.

The reason for the provision of the channel iron 13 on the horizontal portion of the chute is that this portion of the chute flares rearwardly and it is on this portion of the chute that the stalks are gathered together and bound. This gathering of the stalks tends to pull the chain 14 laterally out of alinement with the sprocket wheel 17 and hence it is desirable at this point to provide the channel iron 13, which acts as a guide for the chain, preventing the chain from being pulled laterally.

I claim:—

1. In a corn binder, a butt chute extending upward and rearward, and a clearing chain having its upper flight travelling upward and rearward along said chute and having lugs.

2. In a corn binder, an upwardly and rearwardly extending butt chute, widened at its rear end, an endless chain travelling over the bottom of the chute, a sprocket wheel at the rear end of the chute over which the chain passes and a channel iron guide at the wide rear end of the chute in alinement with the sprocket wheel and through which guide the rear portion of the upper flight of the chain passes.

3. In a corn binder having upwardly and rearwardly extending gatherer boards and opposed upwardly and rearwardly extending chains disposed between the gatherer boards, an upwardly and rearwardly extending chute terminating at its upper end in a relatively wide horizontal portion, an endless chain having its upper flight traversing the chute longitudinally, sprocket wheels over which said endless chain is trained, means for driving said sprocket wheels, and a channel iron guide disposed upon the horizontal portion of the chute in alinement with the adjacent sprocket wheel and through which the upper flight of the chain passes.

4. In a corn binder having upwardly and rearwardly extending gatherer boards and opposed upwardly and rearwardly extending chains disposed between the gatherer boards, an upwardly and rearwardly extending butt chute terminating at its upper end in a horizontal relatively wide portion, a chain supporting roller disposed at the junction of the horizontal with the upwardly inclined portion of the chute, an endless chain having its upper flight traversing the chute and having projecting lugs, sprocket wheels over which said endless chain is trained, and means on a horizontal portion of the chute for guiding the upper flight of the chain to the adjacent sprocket wheel.

THOMAS C. ASKLAND.